Sept. 23, 1924.   1,509,384
V. E. WALTER ET AL
WELDING
Filed March 22, 1923
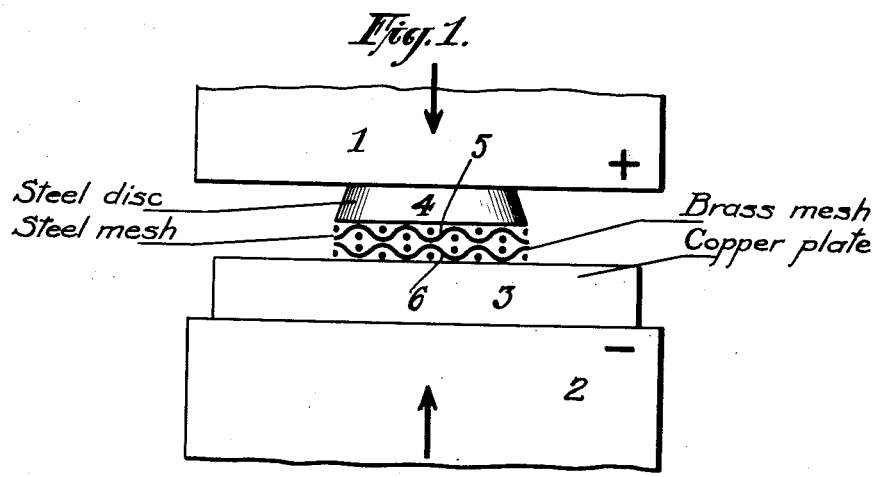
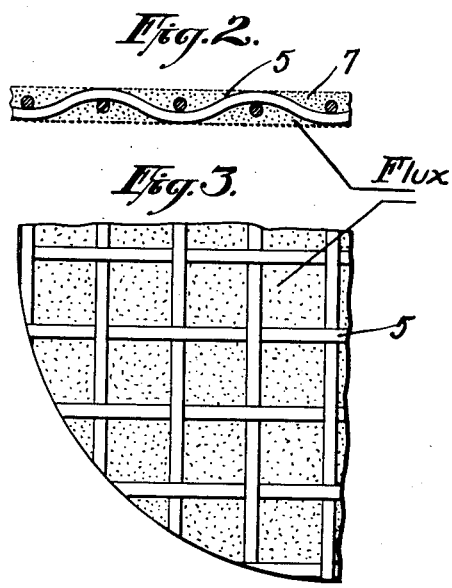
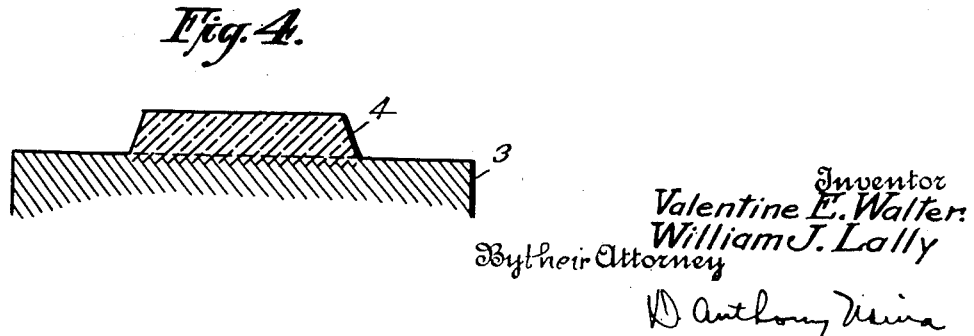
Inventor
Valentine E. Walter
William J. Lally
By their Attorney Patented Sept. 23, 1924.

1,509,384

UNITED STATES PATENT OFFICE.

VALENTINE E. WALTER, OF BROOKLYN, NEW YORK, AND WILLIAM J. LALLY, OF MERIDEN, CONNECTICUT, ASSIGNORS TO THOMAS E. MURRAY, OF BROOKLYN, NEW YORK.

WELDING.

Application filed March 22, 1923. Serial No. 626,746.

*To all whom it may concern:*

Be it known that we, VALENTINE E. WALTER and WILLIAM J. LALLY, citizens of the United States, and residents, respectively, of Brooklyn, New York, and Meriden, Connecticut, have invented certain new and useful Improvements in Welding, of which the following is a specification.

Our invention aims to provide certain improvements adapted to the electric welding together of two pieces of different resistances or different compositions.

Fig. 1 indicates diagrammatically the method of welding a small steel disc to a comparatively large copper plate;

Figs. 2 and 3 are respectively vertical and horizontal sectional views of certain interposed elements;

Fig. 4 is a section of the finished welded product.

In an application of Phelps, No. 616,108, filed January 31st, 1923, there is described a method of welding in which a third part is placed between the two parts to be joined, the assembled parts being then pressed together while passing a welding current through them.

In the application of this process with a single intermediate part it has been found difficult to make a good weld between pieces which varied considerably in total conductivity or resistance due to difference in the size of the pieces or their compositions or both. An example of such a difficult case is in the welding of a small piece of comparatively high resistance metal such as steel to a large piece of a comparatively low resistance metal such as copper. There is a tendency of the steel to melt while the copper still remains too cool to produce a good joint. The current is preferably used in the manner described in the Murray Reissue Patent No. 15,466 of October 10, 1922, using a current of extremely high ampere strength or density per unit of area at the joint and continuing it for a very brief regulated period of time. Under these circumstances the difference between the resistances of the two parts to be joined becomes particularly important.

We have found that by using an insert, preferably in reticulated form such as wire mesh, of steel, in the example above described, the mesh tends to weld to the steel disc but not to the copper plate; and that when a reticulated insert of copper or brass is used it tends to stick to the copper but not to the steel.

We have found, however, that by using two inserts or filling pieces, one adjacent to each work-piece, and particularly by using steel mesh next to the steel work-piece and brass mesh next to the copper work-piece we secure an improved result. In fact by this method we have been able to make a good strong joint.

The example described is illustrated in the accompanying drawings where 1 and 2 are the opposite electrodes. A copper plate 3 is to be welded to a steel disc 4. Between the two are inserted a steel mesh 5 and a brass mesh 6. Besides the wire mesh itself a filling of flux 7 is preferably employed occupying the interstices of the wire mesh. The parts are subjected to pressure in the manner indicated by the arrows and the current applied as above described.

It is not essential that the inserts shall be of identically the same composition as the work-pieces to which they correspond. Each work-piece and its corresponding insert should however be composed largely of the same metal or of metals which have approximately the same melting point so as to be readily weldable to each other.

Instead of using only two inserts or filling pieces, one adjacent to each work-piece, we can, if desired, use a greater number of such inserts of the same or of varying compositions.

Though we have described with great particularity of detail certain specific embodiments of my improvement, yet it is not to be understood therefrom that the invention is restricted to the particular embodiments disclosed. Various modifications may be made by those skilled in the art without departing from the invention as defined in the following claims.

What we claim is:

1. The method of welding together two pieces of different resistances which consists in placing at least two filling pieces between them, one adjacent to each work-piece and corresponding in resistance thereto and passing a welding current and pressing the pieces together.

2. The method of welding together two pieces of different metals respectively which consists in placing between them at least two reticulated pieces each corresponding to the work-piece to which it is adjacent and passing a welding current and pressing the pieces together.

3. The method of claim 2 applied to the welding of a cuprous work-piece to a ferrous work-piece.

4. The method of claim 2 applied to a large cuprous work-piece and a comparatively small ferrous work-piece.

In witness whereof, we have hereunto signed our names.

VALENTINE E. WALTER.
WILLIAM J. LALLY.